United States Patent [19]
Lowery, Jr. et al.

[11] 4,250,288
[45] Feb. 10, 1981

[54] HIGH EFFICIENCY, HIGH TEMPERATURE CATALYST FOR POLYMERIZING OLEFINS

[75] Inventors: Kirby Lowery, Jr.; George W. Knight; James A. May, Jr., all of Lake Jackson, Tex.

[73] Assignee: The Dow Chemical Company, Midland, Mich.

[21] Appl. No.: 765,182

[22] Filed: Feb. 3, 1977

Related U.S. Application Data

[63] Continuation-in-part of Ser. No. 581,294, May 27, 1975, abandoned.

[51] Int. Cl.$^3$ .......................... C08F 4/66; C08F 10/02
[52] U.S. Cl. ................................ 526/137; 252/429 B; 252/431 R; 526/125; 526/144; 526/151; 526/352
[58] Field of Search ................ 526/137, 144, 151, 125

[56] References Cited

U.S. PATENT DOCUMENTS

| | | | |
|---|---|---|---|
| 2,959,576 | 11/1960 | Payne | 526/137 |
| 2,971,950 | 2/1961 | Nolta et al. | 526/137 |
| 3,101,327 | 8/1963 | Lynn | 526/144 |
| 3,161,628 | 12/1964 | Dort et al. | 526/137 |
| 3,385,841 | 5/1968 | Bruton et al. | 526/144 |
| 3,472,910 | 10/1969 | Favis | 526/144 |
| 3,737,393 | 6/1973 | de Vries | 526/151 |
| 3,878,124 | 4/1975 | Durand et al. | 526/144 |

FOREIGN PATENT DOCUMENTS 2517567 10/1975 Fed. Rep. of Germany .
1235062 6/1971 United Kingdom .
1251177 10/1971 United Kingdom .
1305610 2/1973 United Kingdom .

OTHER PUBLICATIONS

Mole et al., Organoaluminium Compounds, Elsevier Publ. Co., New York, (1972), pp. 88, 89, 189, 274 and 281.
Wakefield, Organometal Chem. Rev. 1, (1966), pp. 148-149.
Coates et al., Organometallic Compounds, vol. one, Methuen & Co., Ltd., London, 3rd Ed., (1967), p. 78.
Texas Alkyls, Inc., Technical Brochure, "Aluminum Alkyl . . . Specification, Properties and Procedures, (1973).

*Primary Examiner*—Edward J. Smith

[57] ABSTRACT

Compositions exhibiting high catalytic activity in the polymerization of α-olefins at temperatures above 140° C. are provided by reacting a transition metal compound such as tetra(isopropoxy)titanium, an organomagnesium component such as a hydrocarbon soluble complex of dialkyl magnesium and an alkyl aluminum, e.g., di-n-butylmagnesium.x triethylaluminum and a hydrogen halide or an active hydrocarbyl halide such as t-butyl chloride. Polymerization processes employing this catalyst composition do not require conventional catalyst removal steps in order to provide polymers having suitable color and other physical characteristics.

9 Claims, No Drawings

HIGH EFFICIENCY, HIGH TEMPERATURE CATALYST FOR POLYMERIZING OLEFINS

CROSS-REFERENCE TO RELATED APPLICATION

This is a continuation-in-part of application Ser. No. 581,294 filed May 27, 1975, now abandoned.

BACKGROUND OF THE INVENTION

This invention relates to a new catalyst composition useful for initiating and promoting polymerization of α-olefins and to a polymerization process employing such a catalyst composition.

It is well known that olefins such as ethylene, propylene, and 1-butene in the presence of metallic catalysts, particularly the reaction products of organometallic compounds and transition metal compounds can be polymerized to form substantially unbranched polymers of relatively high molecular weight. Typically such polymerizations are carried out at relatively low temperatures and pressures.

Among the methods for producing such linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups 4b, 5b, 6b and 8 of Mendeleev's Periodic Table of Elements with an organometallic compound. Generally, the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, polymerizaton is carried out in a reaction medium comprising an inert organic liquid, e.g., an aliphatic hydrocarbon and the aforementioned catalyst. One or more olefins may be brought into contact with the reaction medium in any suitable manner, and a molecular weight regulator, which is normally hydrogen, is usually present in the reaction vessel in order to suppress the formation of undesirably high molecular weight polymers.

Following polymerization, it is common to remove catalyst residues from the polymer by repeatedly treating the polymer with alcohol or other deactivating agent such as aqueous base. Such catalyst deactivation and/or removal procedures are expensive both in time and material consumed as well as the equipment required to carry out such treatment.

Furthermore, most of the aforementioned known catalyst systems are more efficient in preparing polyolefins in slurry (i.e., wherein the polymer is not dissolved in the carrier) than in solution (i.e., wherein the temperature is high enough to solubilize the polymer in the carrier). The lower efficiencies of such catalysts in solution polymerization is generally believed to be caused by the general tendency of such catalysts to become rapidly depleted or deactivated by significantly higher temperatures that are normally employed in solution processes.

Recently, catalysts having higher efficiencies have been disclosed, e.g., U.S. Pat. No. 3,392,159, U.S. Pat. No. 3,737,393, West German patent application No. 2,231,982 and British Pat. Nos. 1,305,610 and 1,358,437. While the increased efficiencies achieved by using these recent catalysts are significant, even higher efficiencies are desirable in order to more effectively control the polymerization at polymerization temperatures above 140° C. and the products made thereby.

In view of the foregoing problems encountered in the use of conventional Ziegler catalysts, it would be highly desirable to provide a polymerization catalyst which is sufficiently active, even at solution polymerization temperatures above 140° C., to produce such high quantities of polymer per unit of catalyst that it is no longer necessary to remove catalyst residue in order to obtain a polymer of the desired purity.

SUMMARY OF THE INVENTION

The present invention, in one aspect, is the catalytic reaction product of (A) a compound of a transition metal (TM), (B) an organomagnesium component and (C) a non-metallic monohalide. The magnesium component is (1) a complex of an organomagnesium compound and an organometallic compound such as an alkylaluminum compound which solubilizes the organomagnesium compound in hydrocarbon or (2) an organomagnesium compound. The non-metallic halide corresponds to the formula R'X wherein R' is hydrogen or an active monovalent organic radical and X is halogen. Furthermore, the catalytic reaction product contains a sufficient proportion of aluminum in the form of a hydrocarbyl aluminum compound represented by the formula $R_{3-a}AlX_a$ wherein R is hydrocarbyl, X is halide and a is a number from 0 to 1. The proportions of the foregoing components of said catalytic reaction products are such that the atomic ratio of Mg:TM is from about 5:1 to about 2000:1, the atomic ratio of X:TM is within the range from about 50:1 to about 2000:1, the atomic ratio of Mg:X is within the range from about 0.1:1 to about 1:1, the atomic ratio of Mg:Al is at least about 0.3:1 and the atomic ratio of Al:TM is not more than about 120:1.

In a second aspect, the invention is a process for polymerizing an α-olefin under conditions characteristic of Ziegler polymerization wherein the aforementioned reaction product is preferably employed as the sole catalyst.

In view of the reduced activity of conventional Ziegler catalysts at polymerization temperatures above 140° C., it is indeed surprising that the aforementioned catalytic reaction product is a high efficiency catalyst capable of producing more than a million pounds of olefin polymer per pound of transition metal at polymerization temperatures greater than 150° C., e.g., from 185° to 220° C. and higher. Accordingly, olefin polymers produced in accordance with the foregoing process generally contain lower amounts of catalyst residues than polymers produced in the presence of conventional catalysts even after subjecting such polymers to catalyst removal treatments. Further, these catalytic reaction products enable a higher degree of control over the polymerization in order that a more uniform product can be made. Additionally, the polymer produced in the practice of the present invention has a very narrow molecular weight distribution and is therefore highly useful in molding applications such as injection molding, film application and rotational molding.

DETAILED DESCRIPTION OF THE PREFERRED EMBODIMENTS

The present invention is most advantageously practiced in a polymerization process wherein an α-olefin is polymerized, generally in the presence of hydrogen as a molecular weight control agent, in a polymerization zone containing an inert diluent and the reaction product as hereinbefore described. The foregoing polymerization process is most beneficially carried out under inert atmosphere and relatively low temperature and pressure, although very high pressures are optionally employed.

Olefins which are suitably polymerized or copolymerized in the practice of this invention are generally the aliphatic α-monoolefins having from 2 to 18 carbon atoms. Illustratively, such α-olefins can include ethylene, propylene, butene-1, pentene-1, 3-methylbutene-1, hexene-1, octene-1, dodecene-1, octadecene-1 and the like. It is understood that α-olefins may be copolymerized with other α-olefins and/or with small amounts, i.e., up to about 10 weight percent based on the polymer, of other ethylenically unsaturated monomers such as butadiene, isoprene, pentadiene-1,3, styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene and up to 10, especially from about 0.1 to about 5, weight percent of propylene, butene-1 or similar higher α-olefin based on total monomer.

Advantageously, the novel catalyst composition of the present invention is the reaction product of (A) a compound of a transition metal (hereinafter called "TM") of Groups 4b, 5b, 6b, 7b and 8 of Mendeleev's Periodic Table of Elements as shown in The Chemical Rubber Company's Handbook of Chemistry and Physics, 48th edition, and (B) an intermediate reaction product of (a) a hydrocarbon soluble organomagnesium compound or a hydrocarbon soluble complex of an organomagnesium compound and an organometallic compound having the formula $MR_y$ wherein M is a metal of Groups 2b, 3a including boron, 1a, 4a including silicon; R is a monovalent hydrocarbon radical, i.e., hydrocarbyl, such as alkyl, cycloalkyl, alkenyl, aryl, arylalkyl and alkylaryl, or other monovalent organic radical such as alkoxy, aryloxy, alkoxyalkyl, and the like; and y is a number corresponding to the valence of M, and (b) an active non-metallic halide corresponding to the formula R'X wherein R' is hydrogen or hydrocarbyl such as alkyl, aryl and that are at least as active as sec-butyl and X is halogen, preferably chloride, bromide, and iodide. It is understood that the organic moieties of the aforementioned catalyst components, e.g., R and R', are suitably any other organic radical provided that they do not contain functional groups that poison conventional Ziegler catalysts. Preferably such organic moieties do not contain active hydrogen, i.e., those sufficiently active to react with the Zerewitinoff reagent. The foregoing catalyst composition has an atomic ratio of Mg:TM in the range from about 5:1 to about 2000:1, preferably from about 10:1 to about 200:1, most preferably from about 10:1 to about 60:1; an atomic ratio of Mg:X in the range from about 0.1:1 to about 1:1, preferably from about 0.2:1 to about 0.7:1, most preferably from about 0.4:1 to 0.6:1; and an atomic ratio of X:TM in the range from about 40:1 to about 2000:1, preferably from about 50:1 to about 400:1, most preferably from about 60:1 to about 120:1. Furthermore, the catalytic reaction product contains sufficient $R_{3-a}AlX_a$ as defined hereinbefore (preferably wherein R is alkyl, X is Cl or Br and a is 0 to 1) to provide an atomic ratio of Mg:Al of at least 0.3:1, preferably from about 0.5:1 to about 10:1, more preferably from about 0.6:1 to about 7:1, and an atomic ratio of Al:TM less than about 120:1, preferably less than about 40:1.

Of the suitable transition metal compounds, those of titanium, vanadium, zirconium are more advantageously employed, with those of titanium being most advantageous. Beneficial compounds are the halides, oxyhalides, hydrocarbyloxides (e.g. alkoxides) amides acetylacetonates, alkyls, aryls, alkenyls, and alkadienyls. Of the foregoing transition metal compounds, the hydrocarbyloxides of titanium, so-called titanates, are the most beneficial.

Of the titanates, preferred ones are alkoxides or aryloxides, especially alkoxides having from 1 to 12 carbon atoms or a phenoxide, of trivalent or tetravalent titanium. Such titanates are preferably derived from halides of trivalent or tetravalent titanium including alkyl titanium halides wherein one or more halogen atoms are replaced by an alkoxy or aryloxy group. Exemplary preferred titanates include tetrabutoxytitanium, tetra(isopropoxy)titanium, diethoxytitanium bromide, dibutoxytitanium dichloride, n-butyltriisopropoxytitanium, ethyl dibutoxytitanium chloride, monoethoxytitanium trichloride, tetraphenoxytitanium and the like. Of the preferred titanates, the tetravalent ones wherein all halogen atoms are replaced by alkoxide are most preferred, with tetra(isopropoxy)titanium and tetrabutoxytitanium being especially preferred.

Examples of other transition metal compounds which are advantageously employed are titanium tetrachloride, titanium trichloride, vanadium trichloride, vanadium tetrachloride, vanadium oxychloride, zirconium tetrachloride, titanocene dichloride, zirconium tetraalcoholates such as tetrabutoxyzirconium, vanadium acetylacetonate and the like.

The preferred organomagnesium complex is a hydrocarbon soluble complex illustrated by the formula $MgR_2 \cdot MR_y$ wherein R is hydrocarbyl, M is aluminum, zinc or mixtures thereof and x is about 0.001 to 10 (usually from 0.001 to 3.3 when M is Al) and y denotes the number of hydrocarbyl groups which corresponds to the valence of M. When the organometallic compound ($MR_y$) is an aluminum compound, it is desirable to maintain the atomic ratios of Mg:Al and Al:TM within the ranges specified hereinbefore. In order to obtain maximum catalyst efficiency at polymerization temperatures above 180° C., it is desirable to minimize the amount of aluminum in the complex as well as in the total catalyst so that the atomic ratio of Al:TM in the total catalytic reaction product is less than about 40:1.

This complex is prepared by reacting particulate magnesium such as magnesium turnings or magnesium particles with about a stoichiometric amount of hydrocarbyl halide, illustrated as RX. The resulting hydrocarbon insoluble $MgR_2$ is then solubilized by adding the organometallic compound such as $AlR_3$ or mixtures thereof with $ZnR_2$. When employing a mixture of $AlR_3$ and $ZnR_2$ to solubilized $MgR_2$, the atomic ratio of Zn to Al is from about 3000:1 to about 0.01:1, preferably from about 350:1 to about 1:1. The amount of organometallic compound which is added to the $MgR_2$ to form the organomagnesium complex should be enough to solubilize a significant amount of $MgR_2$, e.g., at least 5 weight percent of MgR$_2$ is solubilized. It is preferred to solubilize at least 50 weight percent of the MgR$_2$ and especially preferred to solubilize all of MgR$_2$.

In suitable complexes, organometallic compounds (other than AlR$_3$, ZnR$_2$ or mixtures thereof) which also solubilize the organomagnesium compound in hydrocarbon are employed in beneficial amounts, usually an amount sufficient to produce an atomic ratio of 0.01:1 to 10:1 of metal of the organometallic compound to magnesium. Examples of such other organometallic compounds include boron trialkyls such as boron triethyl, alkyl silanes such as dimethyl silane and tetraethyl silane.

Alternative to the aforementioned hydrocarbon soluble complexes, it is also advantageous to employ organomagnesium compounds as the organomagnesium component. Such compounds, although conventionally insoluble in hydrocarbon, are suitably employed. These compounds can be rendered soluble in hydrocarbon by addition of ether, amine, etc., although such solubilizing agents often reduce the activity of the catalyst. Recently, such compounds have been made hydrocarbon soluble without using such catalyst poisons, e.g., as taught in U.S. Pat. No. 3,646,231. The more recent hydrocarbon solubilized organomagnesium compounds are the most desirable if an organomagnesium compound is to be used as the organomagnesium component.

Preferably the organomagnesium compound is dihydrocarbylmagnesium such as the magnesium dialkyls and the magnesium diaryls. Exemplary suitable magnesium dialkyls include dibutylmagnesium, dipropylmagnesium, diethylmagnesium, dihexylmagnesium, propylbutylmagnesium and others wherein alkyl has from 1 to 20 carbon atoms. Exemplary suitable magnesium diaryls include diphenylmagnesium, dibenzylmagnesium, and ditolylmagnesium, with the dialkylmagnesiums such as dibutylmagnesium, being especially preferred. Suitable organomagnesium compounds include alkyl and aryl magnesium alkoxides and aryloxides and aryl and alkyl magnesium halides with the halogen-free organomagnesium compounds being more desirable.

In cases wherein the organomagnesium component does not contain aluminum, it is desirable to add a small proportion of an aluminum compound during the preparation of the catalytic reaction product in order to provide the desired Mg:Al and Al:TM ratios specified hereinbefore. Such aluminum compounds which may be added include alkyl aluminum compounds, e.g., a trialkyl aluminum, an alkyl aluminum halide or an aluminum halide. However, when the aluminum compound added is alkyl aluminum dihalide or aluminum halide, steps should be taken that the catalytic reaction product be substantially free of R$_{3-b}$AlX$_b$ wherein b=1.5 or more. Preferably, the catalytic reaction product contains less than 5 weight percent of R$_{3-b}$AlX$_b$, most preferably less than about 1 weight percent, based on the weight of total aluminum compound.

The active non-metallic halides of the formula set forth hereinbefore include hydrogen halides and active organic halides such as t-alkyl halides, allyl halides, benzyl halides and other active hydrocarbyl halides wherein hydrocarbyl is a monovalent hydrocarbon radical. By an active organic halide is meant a hydrocarbyl halide that contains a labile halogen at least as active, i.e., easily lost to another compound, as the halogen of sec-butyl chloride, preferably as active as t-butyl chloride. In addition to the organic monohalides, it is understood that organic dihalides, trihalides and other polyhalides that are active as defined hereinbefore are also suitably employed.

Examples of preferred active halides include hydrogen chloride, hydrogen bromide, t-butyl chloride, t-amyl bromide, allyl chloride, benzyl chloride, crotyl chloride, methylvinyl carbinyl chloride, α-phenylethyl bromide, diphenyl methyl chloride and the like. Most preferred are hydrogen chloride, t-butyl chloride, allyl chloride, and benzyl chloride.

The organomagnesium component is preferably reacted in hydrocarbon with the active non-metallic halide by adding with stirring the halide to the hydrocarbon containing the organomagnesium component. Alternatively, this desired intermediate reaction product may be formed by adding with stirring the organomagnesium component to the active halide or by simultaneously adding and mixing the halide and the organomagnesium component over a period of time. The reaction between the organomagnesium component and the active halide causes the formation of a finely divided insoluble material. This intermediate reaction product contains hydrocarbon soluble portions as well as hydrocarbon insoluble portions. In preferred embodiments, essentially all (preferably 100 weight percent) of the organomagnesium compound is converted to a hydrocarbon insoluble solid. The amount of the halide added to the organomagnesium component is sufficient to provide an atomic ratio of Mg:X as set forth hereinbefore. However, the amount of halide should not be in such amounts and/or in such a manner as to produce significant amounts of R$_{3-b}$AlX$_b$ as defined hereinbefore.

The aforementioned intermediate reaction product is then advantageously mixed with an amount of the transition metal compound, preferably by adding the transition metal compound to the intermediate reaction product, sufficient to provide a catalytic reaction product having an atomic ratio of X:TM and Mg:TM as indicated hereinbefore.

While the catalytic reaction product prepared in the foregoing manner is especially preferred in the practice of this invention, a beneficial catalytic reaction product can be prepared by mixing the active non-metallic halide with the transition metal compound to form an intermediate reaction product thereof and subsequently reacting this intermediate product with the organomagnesium complex. Also suitable, but less preferred, catalytic reaction products can be made by first mixing the organomagnesium complex with the transition metal compound and then adding the active non-metallic halide or by adding and mixing all three components simultaneously.

In the preparation of the foregoing catalytic reaction products, it is preferred to carry out such preparation in the presence of an inert diluent. The concentrations of catalyst components are preferably such that when the active non-metallic halide, and the magnesium complex are combined, the resultant slurry is from about 0.005 to about 0.1 molar (moles/liter) with respect to magnesium. By way of an example of suitable inert organic diluents can be mentioned liquefied ethane, propane, isobutane, n-butane, n-hexane, the various isomeric hexanes, isooctane, paraffinic mixtures of alkanes having from 8 to 9 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about −50° to about 200° C. Also included as suitable inert diluents are benzene, toluene, ethylbenzene, cumene, decalin and the like.

Mixing of the catalyst components to provide the desired catalytic reaction product is advantageously carried out under an inert atmosphere such as nitrogen, argon or other inert gas at temperatures in the range from about −50° to about 150° C., preferably from about 0° to about 50° C. The period of mixing is not considered to be critical as it is found that a sufficient catalyst composition most often occurs within about 1 minute or less. In the preparation of the catalytic reaction product, it is not necessary to separate hydrocarbon soluble components from hydrocarbon insoluble components of the reaction product. Further it is not required to add a cocatalyst or an activator such as an alkyl aluminum compound to the catalytic reaction product in order to obtain a high efficiency catalyst. In fact, it is generally undesirable to add any aluminum compound in excess of the amounts prescribed hereinbefore in order to retain high catalyst efficiency at high polymerization temperatures.

In the polymerization process employing the aforementioned catalytic reaction product, polymerization is effected by adding a catalytic amount of the above catalyst composition to a polymerization zone containing α-olefin monomer, or vice versa. The polymerization zone is maintained at temperatures in the range from about 0° to about 300° C., preferably at solution polymerization temperatures, e.g., from about 150° to about 250° C. for a residence time of about 10 minutes to several hours, preferably 15 minutes to 1 hour. It is generally desirable to carry out the polymerization in the absence of moisture and oxygen and a catalytic amount of the catalytic reaction product is generally within the range from about 0.0001 to about 0.01 milligram-atoms transition metal per liter of diluent. It is understood, however, that the most advantageous catalyst concentration will depend upon polymerization conditions such as temperature, pressure, solvent and presence of catalyst poisons and that the foregoing range is given to obtain maximum catalyst yields. Generally in the polymerization process, a carrier which may be an inert organic diluent or solvent or excess monomer is generally employed. In order to realize the full benefit of the high efficiency catalyst of the present invention, care must be taken to avoid oversaturation of the solvent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitably as defined as hereinbefore.

The polymerization pressures preferably employed are relatively low, e.g., from about 100 to about 500 psig. However, polymerization within the scope of the present invention can occur at pressures from atmospheric up to pressures determined by the capabilities of the polymerization equipment. During polymerization it is desirable to stir the polymerization recipe to obtain better temperature control and to maintain uniform polymerization mixtures throughout the polymerization zone.

In order to optimize catalyst yields in the polymerization of ethylene, it is preferable to maintain an ethylene concentration in the solvent in the range from 1 to 10 weight percent, most advantageously 1.2 to 2 weight percent. To achieve this when an excess of ethylene is fed into the system, a portion of the ethylene can be vented.

Hydrogen is often employed in the practice of this invention to lower molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalytic reaction product in any conventional manner, preferably by bringing the catalytic reaction product and monomer together with intimate agitation provided by suitable stirring or other means. Agitation can be continued during polymerization, or in some instances the polymerization can be allowed to remain unstirred while polymerization takes place. In the case of more rapid reactions with more active catalysts, means can be provided for refluxing monomer and solvent, if any of the latter is present and thus remove the heat of reaction. In any event, adequate means should be provided for dissipating the exothermic heat of polymerization. If desired, the monomer can be brought in the vapor phase into contact with the catalytic reaction product, in the presence or absence of liquid material. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent. The resultant polymer is found to contain insignificant amounts of catalyst residue and to possess a very narrow molecular weight distribution.

The following examples are given to illustrate the invention, and should not be construed as limiting its scope. All parts and percentages are by weight unless otherwise indicated.

GENERAL OPERATING PROCEDURE FOR WORKING EXAMPLES

In the following examples the catalyst preparations are carried out in the absence of oxygen or water in a nitrogen filled gloved box. The catalyst components are used as diluted solutions in either n-heptane or Isopar E ® (a mixture of saturated isoparaffins having 8 to 9 carbon atoms). The polymerization reactions are carried out in a five-liter stainless steel stirred batch reactor at 150° C. unless otherwise stated. In such polymerization reactions two liters of dry oxygen-free Isopar E ® are added to the reactor and heated to 150° C. The reactor is vented to about 25 psig and 15 to 20 psi of hydrogen is added for polymer molecular weight control. Then, 120 psi of ethylene is added to the reactor and the ethylene pressure is set to maintain the reactor pressure at 155 to 165 psig. The catalyst is then pressured into the reactor using nitrogen and the reactor temperature is maintained for the desired polymerization time. The polymerization reactor contents are dumped into a stainless steel beaker and allowed to cool. The resulting slurry is filtered and the polymer dried and weighed. The ethylene consumption during polymerization is recorded with a DP cell which shows the rate of polymerization and the amount of polymer produced. Catalyst efficiencies are reported as grams of polyethylene catalyst per gram of titanium, g.PE/g.Ti.

EXAMPLE 1

A catalyst is prepared by adding with stirring 0.946 ml of 0.519 M di(n-butyl)magnesium.2 triethylaluminum to a solution of 15 ml of 0.123 M anhydrous hydrogen chloride in Isopar E ®. A white precipitate results immediately upon addition of the magnesium complex. To the resultant slurry are added 1.18 ml of 0.01 M tetra(isopropoxy)titanium and 82.9 ml of Isopar E ®. A 12.7-ml aliquot (0.0015 mmole Ti) of this catalyst is added to the polymerization reactor producing an increase in temperature to 167° C. After 30 minutes, 230 grams of linear polyethylene is formed to give a catalyst efficiency of $3.2 \times 10^6$ g.PE/g.Ti.

EXAMPLE 2

A catalyst is prepared by adding 93 ml of Isopar E ®, 2.5 ml of 1.15 M t-butylchloride in Isopar E ®, 3.05 ml of 0.295 M di(n-butyl)magnesium.2 triethylaluminum to a 4 oz. bottle. To the resultant slurry is added 1.5 ml of 0.01 M tetra(isopropoxy)titanium. Ten millileters of this catalyst (0.0015 mmole Ti) is added to the polymerization reactor and after 30 minutes the reactor contents are dumped. The yield of polymer is 204 grams indicating a catalyst efficiency of $2.8 \times 10^6$ g.PE/g.Ti.

EXAMPLE 3

To 247 pounds of Isopar E ® is added 133 pounds of 0.516 M di(n-butyl)magnesium.2 aluminum triethyl complex. An 11.75-lb. portion of hydrogen chloride gas is added to the foregoing solution of the complex with agitation. The resultant slurry is cooled to ambient temperature (~25° C.) and 322 ml of neat tetra(isopropoxy)-titanium is added. The resulting catalyst is diluted with Isopar E ® to give 500 pounds of total catalyst. This catalyst is added continuously to a 6900-gallon reactor along with 40,000 lbs/hr of ethylene and Isopar E ®. The amounts of catalyst and Isopar E ® are varied to maintain a reactor temperature of at least 185° C. Hydrogen is added to the reactor to control molecular weight of the polymer such that the polymer has a Melt Index of 2.5 to 12 decigrams per minute as determined by ASTM D-1238-65T (Condition E). The catalyst efficiency of the foregoing polymerization is greater than $1 \times 10^6$ g.PE/g.Ti.

EXAMPLE 4

To establish the improved stability of the present catalyst at high temperature, three runs are carried out employing catalysts which differ only as to source of halide and concentration of aluminum.

In accordance with the present invention, a catalyst is prepared by adding to 30.16 Kg. of Isopar E ® the following components:
 311.85 g. of HCl gas
 5.556 Kg. of 0.548 M DBMg.2ATE* in Isopar E ®
 29.6 mols. (28.27 g.) of neat tetra(isopropoxy)-titanium
*di(n-butyl)magnesium.2 aluminum triethyl The resulting catalyst has an atomic ratio as follows:

Cl/Mg/Al/Ti=90/31.5/59.5/1.

Following the general polymerization procedure in a 250-gallon stirred reaction vessel set hereinbefore except employing a polymerization temperature of 185° C., the foregoing catalyst exhibits a catalyst efficiency of $1.07 \times 10^6$ g.PE/g.Ti.

For purposes of comparison, a catalyst is prepared by adding to 25.54 Kg. of Isopar E ® the following components:
 6.01 Kg. of 15 percent ethylaluminum dichloride in Isopar E ®
 6.69 Kg. of 0.548 M DBMg.2ATE* in Isopar E ®
 31.5 mols. (30.08 g.) neat tetra(isopropoxy)titanium.
*di(n-butyl)magnesium.2 aluminum triethyl The resulting catalyst has an atomic ratio as follows:

Cl/Mg/Al/Ti=134/40/147/1

Again following the foregoing general polymerization procedure except for polymerization temperature two runs using this catalyst are carried out at polymerization temperatures of 150° C. and 170° C. In these runs, the catalyst exhibits catalyst efficiencies of $1.16 \times 10^6$ g.PE/g.Ti and $0.43 \times 10^6$ g.PE/g.Ti, respectively. In a similar run wherein a polymerization temperature of 185° C. is employed, no measurable amount of polyethylene is produced.

EXAMPLE 5

As evidence of preferred order of addition of components in catalyst preparation, three runs are carried out under similar conditions except that the order of addition of components in preparation of the catalyst differs from one run to another. The components of the catalyst are as follows:
 0.0657 g. of HCl in 15 mls. of Isopar E ®
 0.1726 g. of 0.51 M DBMg.2ATE* in Isopar E ®
 0.0039 g. of neat tetra(isopropoxy)titanium.
*di(n-butyl)magnesium.2 aluminum triethyl Atomic ratio of the components is Cl/Mg/Al/Ti=130/40/80/1.

Polymerization is carried out according to the procedure of Example 4 using a polymerization temperature of 150° C. The results are recorded in Table I.

TABLE I

| Run No. | Order of Addition (1) | Catalyst Efficiency, (2) g . PE/g . Ti |
|---|---|---|
| 1 | HCl/DBMg . 2ATE*/Ti(OiPr)$_4$ | $2.0 \times 10^6$ |
| 2 | HCl/Ti(OiPr)$_4$/DBMg . 2ATE* | $0.98 \times 10^6$ |
| 3 | DMBg . 2ATE*/Ti(OiPr)$_4$/HCl | $0.68 \times 10^6$ |

(1) Components added to the catalyst reaction vessel in left to right order. In Run No. 3, the mixture of DBMg . 2ATE* + Ti(OiPr)$_4$ is added to HCl in Isopar E ®.
(2) Catalyst efficiency in grams of polyethylene per gram of titanium.
*di(n-butyl)magnesium . 2 aluminum triethyl

EXAMPLE 6

To illustrate the relation between Al:Ti and Al:Mg ratios and catalyst efficiencies as temperature increases, several runs are carried out using different proportions of the following catalyst components:

anhydrous HCl
DBMg.x ATE*
tetra(isopropoxy)titanium

*di(n-butyl)magnesium.x aluminum triethyl wherein x is a value between 1/6 and 2 obtained by combining different amounts of DBMg.1/6 ATE and DBMg.2ATE in Isopar E ®. The ratios of the foregoing catalyst components are shown in Table II.

Following the polymerization procedure of Example 4 at a polymerization temperature as indicated in Table II, ethylene is polymerized in the presence of the several catalysts and the results are shown in Table II.

TABLE II

| Run No. | Atomic Ratio, Cl/Mg/Al/Ti | Polymerization Temperature, °C. | Catalyst Efficiency, g . PE/g . Ti |
|---|---|---|---|
| 1 | 134/40/58/1 | 185 | $1.8 \times 10^6$ |
| 2 | 90/40/58/1 | 185 | $1.0 \times 10^6$ |
| 3 | 90/40/40/1 | 189 | $1.0 \times 10^6$ |
| 4 | 90/40/20/1 | 196 | $1.0 \times 10^6$ |
| 5 | 90/40/13.3/1 | 199 | $1.6 \times 10^6$ |
| 6 | 90/40/8/1 | 199 | $1.5 \times 10^6$ |
| 7 | 90/40/8/1 | 205 | $1.4 \times 10^6$ |
| 8 | 84.5/40/6.25/1 | 212 | $1.1 \times 10^6$ |

As evidenced by the foregoing data of Example 4 and Table II, as polymerization temperature increases, the ratio of Al:Mg and Al:Ti should be reduced in order to obtain high catalyst efficiencies.

What is claimed is:

1. A process for the polymerization of an α-olefin under conditions characteristic of Ziegler polymerization in the presence of a catalytic amount of a catalytic reaction product of (A) compound of a transition metal (TM), (B) an organomagnesium component selected from (1) an organomagnesium compound or (2) a complex of an organomagnesium compound and an organometallic compound in an amount sufficient to solubilize the organomagnesium compound in hydrocarbon and (C) an active non-metallic halide, said non-metallic halide corresponding to the formula R'X wherein R' is hydrogen or a hydrocarbyl group containing a labile halogen atom as easily lost to another compound as the chloride atom of sec-butyl chloride and X is halogen; said reaction product being produced in a manner such that the organomagnesium component reacts with the non-metallic halide to form a hydrocarbon insoluble portion, and further provided that sufficient aluminum, in the form of a hydrocarbyl-aluminum compound represented by the formula $R_{3-a}AlX_a$ wherein R is hydrocarbyl, X is halide and a is a number from 0 to 1.5, is present in the catalytic reaction product in an amount sufficient to provide a reaction product that is catalytic for the polymerization of an α-olefin; the proportions of the foregoing components of said catalytic reaction product being such that the atomic ratio of Mg:TM is within the range from about 5:1 to about 2000:1, the atomic ratio of X:TM is within the range from about 50:1 to about 2000:1, the atomic ratio of Mg:X is within the range from about 0.2:1 to about 1:1, the atomic ratio of Mg:Al is at least 0.3:1, and the atomic ratio of Al:TM is not more than about 120:1 and said process is carried out at a polymerization temperature of at least 185° C.

2. The process of claim 1 wherein the organo-magnesium compound is a dihydrocarbyl magnesium.

3. The process of claim 1 wherein the organomagnesium component is a complex of dialkyl magnesium and a trialkyl aluminum represented by the formula $MgR_2.XAlR_3$ wherein R is alkyl and X is from about 0.001 to 3.3.

4. The process of claim 3 wherein the atomic ratio of Mg:TM is from about 10:1 to about 60:1, the atomic ratio of Mg:X is from about 0.2:1 to about 0.7:1 and the atomic ratio of Mg to Al is from about 0.6:1 to about 7:1 for the total catalytic reaction product.

5. The process of claim 4 wherein the transition metal compound is a hydrocarbyloxide of tetravalent or trivalent titanium.

6. The process of claim 5 wherein the catalytic reaction product is the reaction product of the alkoxide of titanium with an intermediate reaction product of the organomagnesium component and the non-metallic halide.

7. The process of claim 1 wherein the transition metal compound is tetra(alkoxy)titanium, the organo-magnesium compound is dihydrocarbyl magnesium, the organometallic compound is trihydrocarbyl aluminum, the non-metallic halide is hydrogen halide or a t-alkyl halide, the Mg:X ratio is from about 0.2:1 to about 0.7:1, the Mg:Al ratio is from about 0.6:1 to about 7:1, the Al:Ti ratio is less than about 40:1, and the polymerization temperature is at least about 185° C.

8. The process of claim 7 wherein the ester of titanium is tetra(alkoxy)titanium, the organomagnesium compound is dialkyl magnesium, the non-metallic halide is hydrogen chloride, the α-olefin is ethylene or a mixture of ethylene and up to 10 weight percent of higher α-olefin and the process is carried out at a polymerization temperature from about 185° C. to about 250° C.

9. The process of claim 8 wherein the non-metallic halide is hydrogen chloride, the tetra(alkoxy)titanium is tetra(isopropoxy)titanium or tetra(butoxy)titanium, the dialkyl magnesium is dibutyl magnesium, the α-olefin is ethylene or a mixture of ethylene and up to 5 weight percent of propylene or butene-1, the Mg:X ratio is from about 0.4:1 to 0.6:1 and the process is carried out at a polymerization temperature above 220° C.

* * * * *

UNITED STATES PATENT AND TRADEMARK OFFICE
CERTIFICATE OF CORRECTION

PATENT NO. : 4,250,288

DATED : February 10, 1981

INVENTOR(S) : Kirby Lowery, Jr.; George W. Knight; James A. May, Jr.

It is certified that error appears in the above—identified patent and that said Letters Patent is hereby corrected as shown below:

Column 1, line 38, delete "polymerizaton" and insert --polymerization--.

Column 4, line 43, delete "$MgR_2 \cdot MRy$" and insert --$MgR_2 \cdot xMRy$--.

Column 9, line 37, delete "millileters" and insert --milliliters--.

Column 10, in Table I, line 64, delete "DMBg" and insert --DBMg--.

Column 12, line 47, delete "about";
  line 56, delete "above 220°C and insert --from 185°C to 220°C--.

Signed and Sealed this

Nineteenth Day of October 1982

|SEAL|

Attest:

Attesting Officer

GERALD J. MOSSINGHOFF

Commissioner of Patents and Trademarks